(12) United States Patent
Inoue et al.

(10) Patent No.: US 7,513,848 B2
(45) Date of Patent: Apr. 7, 2009

(54) CONTROL DEVICE FOR A TRANSMISSION HAVING A PLURALITY OF AUTOMATIC CLUTCHES

(75) Inventors: Hideaki Inoue, Sagamiko-machi (JP); Satoshi Kishi, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 427 days.

(21) Appl. No.: 11/414,624

(22) Filed: Apr. 28, 2006

(65) Prior Publication Data

US 2006/0248971 A1 Nov. 9, 2006

(30) Foreign Application Priority Data

Apr. 28, 2005 (JP) ............................. 2005-130976

(51) Int. Cl.
*B60W 10/02* (2006.01)
*B60W 10/06* (2006.01)
*B60W 10/18* (2006.01)

(52) U.S. Cl. ........................... 477/74; 477/97; 477/171; 192/3.63; 192/220; 192/103 C; 192/82 T

(58) Field of Classification Search ................... 477/94, 477/901, 74, 171
See application file for complete search history.

(56) References Cited

U.S. PATENT DOCUMENTS

| 4,517,859 | A | 5/1985 | Nagaoka et al. |
| 5,890,392 | A | 4/1999 | Ludanek et al. |
| 2006/0113158 | A1* | 6/2006 | Popp et al. .................. 192/220 |

FOREIGN PATENT DOCUMENTS

| DE | 19631983 C1 | 2/1998 |
| DE | 10308699 A1 | 10/2003 |
| EP | 1617108 | 1/2006 |
| JP | 2000-234654 A | 8/2000 |

* cited by examiner

*Primary Examiner*—Sherry L Estremsky
*Assistant Examiner*—Edwin A Young
(74) *Attorney, Agent, or Firm*—Global IP Counselors, LLP

(57) ABSTRACT

A transmission has a first gearshift group, a second gearshift group, and a controller. The controller is configured to perform a method that includes fully coupling the first gearshift group to an engine drive shaft, and partially coupling the second gearshift group to the drive shaft while the first gearshift group is fully coupled to the drive shaft.

21 Claims, 8 Drawing Sheets

| The selectable gearshift for the current state \ Standby gearshift | 1 | 2 | 3 | 4 | 5 | 6 |
|---|---|---|---|---|---|---|
| 1 | — | D | — | B | — | A |
| 2 | D | — | D | — | C | — |
| 3 | — | D | — | E | — | C |
| 4 | B | — | E | — | E | — |
| 5 | — | C | — | E | — | E |
| 6 | A | — | C | — | E | — |

FIG. 7

CONTROL DEVICE FOR A TRANSMISSION HAVING A PLURALITY OF AUTOMATIC CLUTCHES

CROSS-REFERENCE

The present application claims priority under 35 U.S.C. § 119 of Japanese Patent Application No. 2005-130976, titled "A CONTROL DEVICE FOR A TRANSMISSION HAVING A PLURALITY OF AUTOMATIC CLUTCHES," filed on Apr. 28, 2005, the entire content of which is expressly incorporated by reference herein.

FIELD

The present invention employs a transmission having a plurality of automatic clutches to generate braking force in a vehicle.

BACKGROUND

An example of known conventional technology, in which a transmission having a plurality of automatic clutches, is disclosed in Unexamined Japanese Patent Application Publication No. 2000-234654 (hereafter referred to as prior art.). The transmission having a plurality of automatic clutches described in the aforementioned conventional technology is a so-called twin-clutch transmission and is equipped with two input shafts, of which the first input shaft is hollow, the second input shaft passes coaxially through the inside of the first input shaft, and the first input shaft and second input shaft are arranged coaxially with the engine drive shaft. Between the engine drive shaft and the first input shaft is provided the first automatic clutch, and between the engine drive shaft and the second input shaft is provided the second automatic clutch. On the first input shaft is provided a gear mechanism comprised of a gear group consisting of a second speed shift, fourth speed shift, and sixth speed shift. On the second input shaft is a gear mechanism comprised of a gear group consisting of a reverse shift, first speed shift, third speed shift, and fifth speed shift. The gear groups consisting of these gearshifts are equipped with a synchronous engaging device for coupling with the counter shaft on the output shaft side. One selectable gearshift is selected from first through sixth speeds or reverse, and the synchronous engaging device is operated to either place the vehicle in drive or apply the engine brake and coast. In doing so, the gear group of the selected gearshift is coupled with the counter shaft, the first or second automatic clutch pertaining to the gear group of the selected gearshift is engaged, and a transmission path is formed for the drive coupling.

SUMMARY

However, for the aforementioned conventional technology, when the engine brake is applied and the vehicle coasts, if sufficient braking force cannot be achieved by simply applying the engine brake and the driver, also uses the hydraulic brake, this may accelerate the deterioration of the brake disks or the hydraulic oil. The present invention was contrived in light of the aforementioned circumstances, and its purpose is to propose a control device for a transmission having a plurality of automatic clutches that can achieve braking force by controlling the transmission having a plurality of automatic clutches.

The transmission having a plurality of automatic clutches comprises a first input shaft having a plurality of gearshifts that form the first gearshift group and a second input shaft having a plurality of gearshifts that form the second gearshift group. A first automatic clutch is inserted between the first input shaft and the engine drive shaft, and a second automatic clutch is inserted between the second input shaft and the engine drive shaft. A controller that selects one gearshift from one of either the first gearshift group or the second gearshift group, based on the operating conditions, engages one clutch corresponding to one gearshift group of either the first or second clutches, selects one gearshift from the other gearshift group of either the first or second gearshift group, causes the clutch corresponding to the other gearshift group of either the first or second clutches to slip, and performs interlock brake control. In this manner, a stable deceleration speed can continuously be achieved, regardless of how the operation of the engine brake is performed, by causing an interlock inside of the transmission and generating a braking force.

BRIEF DESCRIPTION OF THE DRAWINGS

FIG. 7 is a chart used for deciding gradients A~E, which are used for performing the slip-engagement of the other clutch that is not completely engaged, based on the selectable gearshift for the current state and the standby gearshift.

EXPLANATION OF THE REFERENCE SYMBOLS

Figure 1:
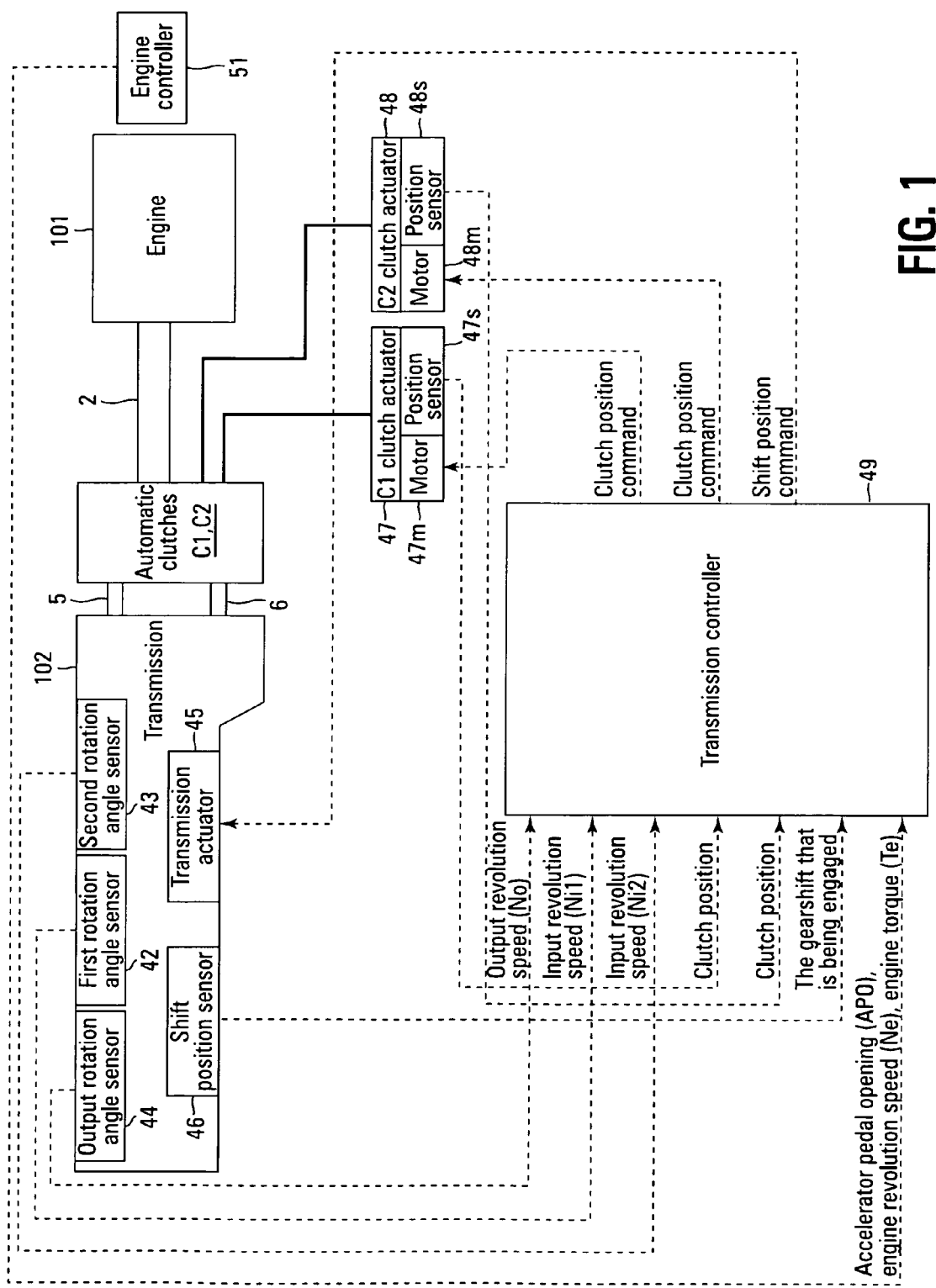
FIG. 1 shows the system constitution of the drive system of a vehicle equipped with the control device for the transmission having a plurality of automatic clutches for one embodiment of the present invention.

2 Engine crankshaft (engine drive shaft)
C1 Automatic clutch for odd numbered gearshifts
C2 Automatic clutch for even numbered gearshifts
5 First input shaft
5b Rear end portion of the first input shaft
6 Second input shaft
15 Counter shaft (output shaft)
19 Counter gear
20 Differential gear device
GR Reverse gear group
G1 First speed gear group
G2 Second speed gear group
G3 Third speed gear group
G4 Fourth speed gear group
G6 Sixth speed gear group
30 Synchronous engaging device for the reverse, first speed and fifth speed gear group
37 Synchronous engaging device for the third and sixth speed gear group 38 Synchronous engaging device for the second and fourth speed gear group
49 Transmission controller
102 The transmission having a plurality of automatic clutches

DETAILED DESCRIPTION

Next is provided a detailed explanation of an embodiment of the present invention based on the working example shown in the drawings.

Figure 2:
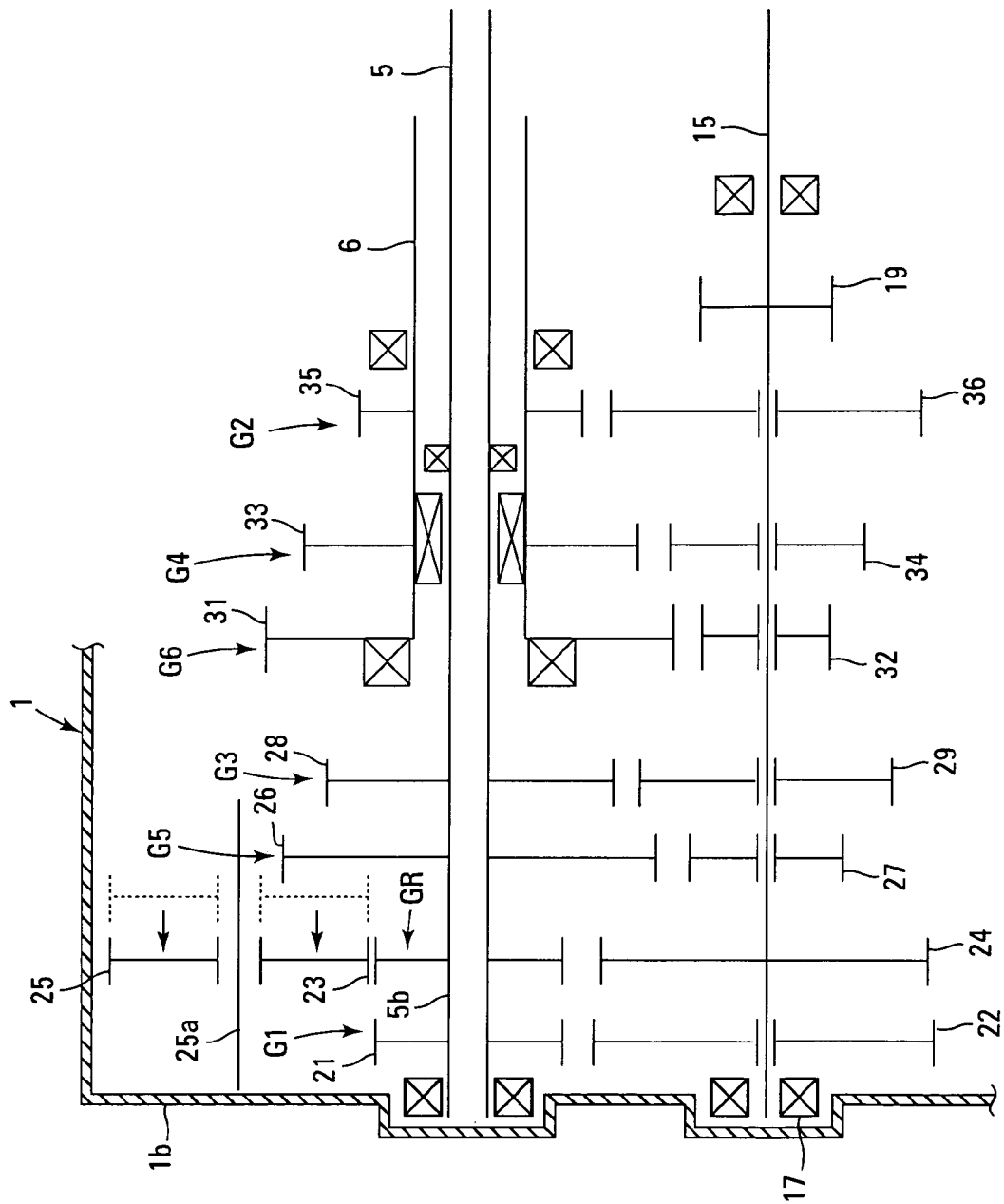
FIG. 2 is an outline of the transmission having a plurality of automatic clutches loaded in the drive system for the same vehicle.

FIG. 1 shows the constitution of the drive system equipped with a control device for the transmission having a plurality of automatic clutches, or the so-called twin clutch transmission, as one embodiment of the present invention. FIG. 2 is an outline of this transmission having a plurality of automatic clutches, and FIG. 3 shows the actual constitution of this transmission having a plurality of automatic clutches.

A crankshaft 2 (engine drive shaft) of an engine 101 is drive coupled with the transmission having a plurality of automatic clutches 102 via twin clutches C1 and C2. As is explained in detail below, the transmission having a plurality of automatic clutches 102 is equipped with two input shafts 5 and 6, and selectively inputs the engine output to either input shaft 5 or 6 by engaging one of twin clutches C1 or C2 and opening the other.

Figure 3:
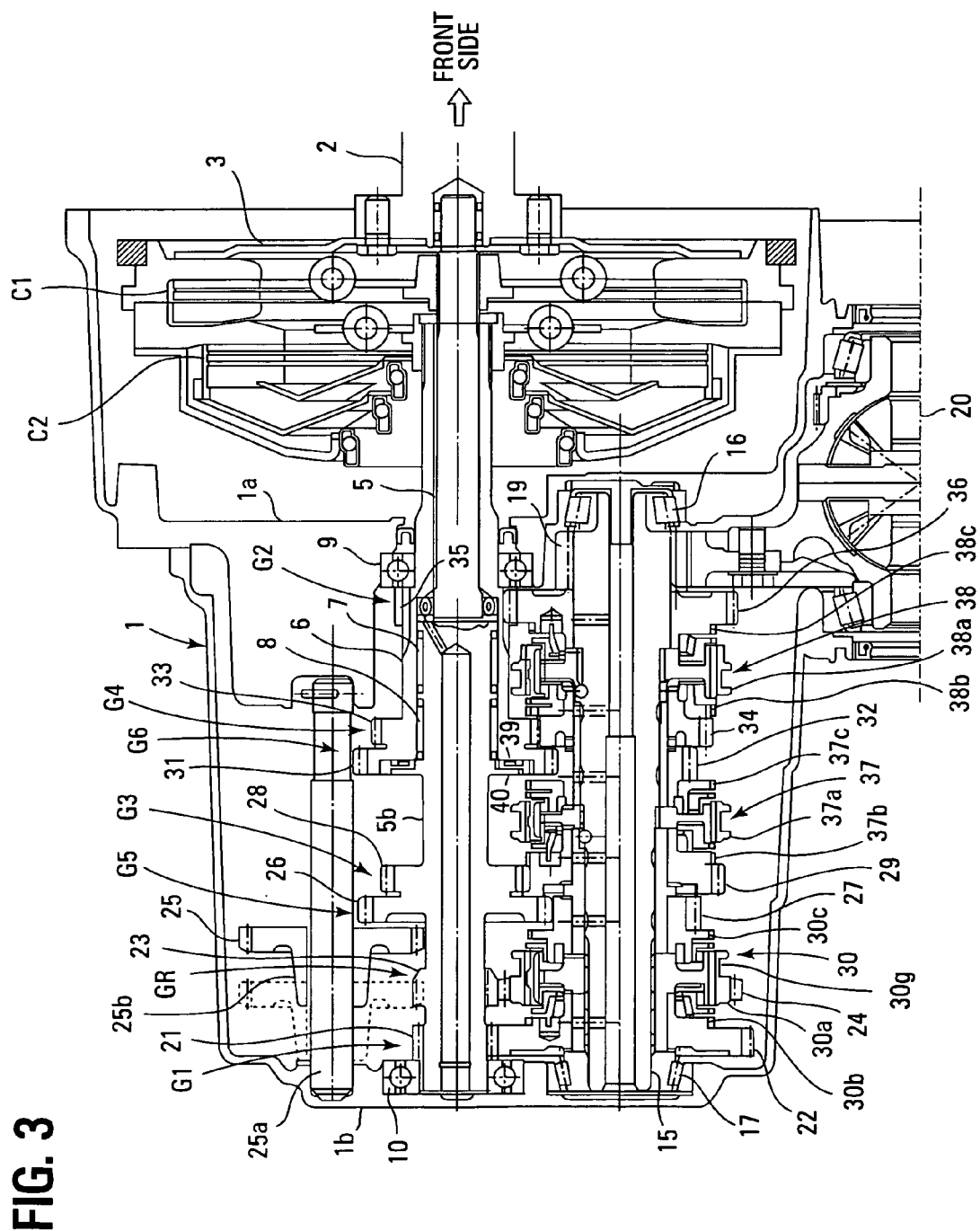
FIG. 3 is the actual constitution of the same transmission having a plurality of automatic clutches

As shown in FIG. 3, the transmission having a plurality of automatic clutches 102 has a deceleration mechanism, such as a differential gear device, in addition to a transaxle that is useful in a front engine, front-wheel drive vehicle (FF vehicle). The transmission having a plurality of automatic clutches 102 is provided with a first rotation angle sensor 42 for detecting the revolution speed of first input shaft 5, a second rotation angle sensor 43 for detecting the revolution speed of second input shaft 6, an output rotation angle sensor 44 for detecting the revolution speed of counter shaft 15, which corresponds to the output shaft of the transmission having a plurality of automatic clutches 102, a transmission actuator 45 for operating synchronous engaging devices 30, 37 and 38, and a shift position sensor 46 for detecting the gearshift that is actually being engaged by synchronous engaging devices 30, 37 and 38.

Also provided is a clutch actuator 47, which engages and opens automatic clutch C1 of the twin clutches and clutch actuator 48, which engages and opens automatic clutch C2 of the twin clutches. Clutch actuator 47 is equipped with motor 47m, which puts the clutch position of automatic clutch C1 in forward or reverse, and position sensor 47s, which detects the actual clutch position. Similarly, clutch actuator 48 is equipped with motor 48m, which puts the clutch position of automatic clutch C2 in forward or reverse, and position sensor 48s, which detects the actual clutch position. These clutch actuators 47 and 48 execute ON/OFF control by completely engaging or completely opening, and can also perform control by changing the clutch position in order to execute the slip engagement and execute switching control and the braking function.

A transmission controller 49 determines the appropriate gearshift based on the driving conditions of the vehicle, such as the speed (vehicle speed), and performs gearshift control of the transmission having a plurality of automatic clutches 102. Input to transmission controller 49 are input revolution speed Ni1 detected by first rotation angle sensor 42, input revolution speed Ni2 detected by second rotation angle sensor 43, output revolution speed No detected by output rotation angle sensor 44, the gearshift that is in the process of being engaged that is detected by shift position sensor 46, accelerator pedal opening APO from engine controller 51 that controls the output of engine 50, engine revolution speed Ne, and engine torque Te.

Transmission controller 49 obtains the target selectable gearshift by referencing a map for determining the gear shifting ratio (gearshift) based on the aforementioned input signals, such as the output revolution speed No (the value corresponding to the vehicle speed), or the input revolution speeds Ni1, Ni2. The clutch position commands (complete engagement, slip engagement or completely opened) sent to clutch actuators 47 and 48, which execute this target selectable gearshift, output shift position commands to transmission actuator 45, respectively. In addition, transmission controller 49 causes an interlock between first input shaft 5, second input shaft 6, and counter shaft 15, when necessary, and applies the brake function to the transmission having a plurality of automatic clutches 102. In this manner, the revolution speed of counter shaft 15 that corresponds with the output shaft is decelerated.

Next is provided an explanation of the constitution of the transmission having a plurality of automatic clutches 102 based on FIGS. 2 and 3. A symbol 1 in FIGS. 2 and 3 represents the transmission case, and housed inside of transmission case 1 is the gear shifting mechanism, which is explained below, and the engine (only crankshaft 2 is shown in FIG. 3). Between transmission case 1 and the engine are inserted automatic clutch C1 used for odd numbered gear shifting (first, third, fifth speeds and reverse) and automatic clutch C2 used for even numbered gear shifting (second, fourth and sixth speeds), which constitute the twin-clutch transmission. Both automatic clutches C1 and C2 couple with engine crankshaft 2 via drive plate 3.

The gear shifting mechanism housed inside of transmission case 1 and shown in FIG. 2, as explained below with additional reference to FIG. 3, is equipped with first input shaft 5 used for odd numbered gear shifting and second input shaft 6 used for even numbered gear shifting, which are both selectively input to the engine revolution speed from drive plate 3 via automatic clutch C1 used for odd numbered gear shifting and automatic clutch C2 used for even numbered gear shifting.

Second input shaft 6 is hollow. The second input shaft 6 is disposed on the periphery of first input shaft 5. Inserted in the loop-shaped space between first input shaft 5 and second input shaft 6 are front needle bearing 7 and rear needle bearing 8. Needle bearings 7 and 8 are smoothing mechanisms that are lubricated with lubricating oil and enable first input shaft 5 on the inside and second input shaft 6 on the outside to rotate freely in relation to one another in a concentric state.

The ends on the engine side of first input shaft 5 and second input shaft 6, which are supported so that they can rotate freely in relation to one another, as explained above, pass through front wall 1a of transmission case 1 so that they couple with the corresponding automatic clutch C1 and C2.

The periphery of the front end of the engine side end of second input shaft 6 is supported to front wall 1a of transmission case 1 by ball bearing 9 so that second input shaft 6 can rotate freely. Ball bearing 9 is supported by passage portion 1h of front wall 1a. Second speed input gear 35, which is explained below, is formed adjacent to ball bearing 9 on second input shaft 6, which is further away than ball bearing 9 when viewed from crankshaft 2 of the engine, and after this, in order, are formed fourth speed input gear 33 and sixth speed input gear 31.

First input shaft 5 protrudes from the rear end of second input shaft 6 and rear end portion 5b of the protruding first input shaft 5 is supported to rear wall 1b of transmission case 1 by ball bearing 10 so that first input shaft 5 can rotate freely.

From the front of first input shaft 5b to the rear end are formed, in order, third speed input gear 28, fifth speed input gear 26, reverse input gear 23 and first speed input gear 21, which are explained below.

Arranged parallel to counter shaft 15 are first input shaft 5 and second input shaft 6 and both ends of counter shaft 15 are supported to front wall 1a and rear wall 1b of transmission case 1 by roller bearings 16 and 17 so that they can rotate freely. On the front end of counter shaft 15 is formed counter gear 19 and provided on the same axis in the right-angled surface is differential gear device 20. Differential gear device 20 is drive coupled with right and left drive wheels not shown in the drawing. Disposed between rear end portion 5b of first input shaft 5 and counter shaft 15 is the gearshift group for the odd numbered gear shifting (first, second, third, fifth speeds and reverse), or in other words, in order, from the front side closest to the engine are disposed third speed gear group G3, fifth speed gear group G5, reverse gear group GR and first speed gear group G1.

First speed gear group G1 and reverse gear group GR apply a large load to first input shaft 5 and counter shaft 15 in order to transmit a low-revolution-speed-large-torque output. Therefore, it is advantageous to dispose gear groups G1 and GR in the vicinity of the bearing, ball bearing 10, and roller bearing 17 from the standpoint of strength. Therefore, first speed gear group G1 is disposed at the very end of counter shaft 15 and rear end portion 5b so that ball bearing 10 and roller bearing 17 are adjacent to one another, and reverse gear group GR is disposed in the vicinity of the engine side of first speed gear group G1.

The remaining third speed gear group G3 and fifth speed gear group G5 apply a small load to first input shaft 5 and counter shaft 15 in order to transmit a high-revolution-speed-small-torque output. Therefore, gear groups G3 and G5 can be disposed on the front side of rear end portion 5b, which is further away from the bearing. Then, fifth speed gear group G5 is disposed so that it is adjacent to the front side of reverse gear group GR and third speed gear group G3 is disposed so that it is adjacent to the engine side of fifth speed gear group G5.

First speed gear group G1 is composed so as to allow for mutual engagement between first speed input gear 21 formed as a single unit on rear end portion 5b of first input shaft 5 and first speed output gear 22 provided on counter shaft 15 so that it can rotate freely.

Reverse gear group GR comprises reverse input gear 23 formed as a single unit on rear end portion 5b of first input shaft 5, reverse output gear 24 provided on counter shaft 15 so that it can rotate freely and reverse idler gear 25, which is drive coupled in reverse rotation between gears 23 and 24 so as to engage them, and reverse idle gear 25 is rotatably supported by reverse idler shaft 25a, which hangs between front wall 1a and rear wall 1b of the transmission case. Reverse idler gear 25 is positioned on reverse idler shaft 25a in an axial direction so that it can slide upon contact and when in its normal state (a non-reversed state), it is positioned at the engine side, as shown by the broken lines in FIG. 2 and the solid lines in FIG. 3 so that it does not engage with reverse input gear 23. In addition, reverse idler gear 25 does not engage with reverse output gear 24, or any other gear, and is positioned so that it can rotate freely. On the other hand, when in reverse, it slides on top of reverse idler shaft 25a in the direction indicated by the arrow in FIG. 2 so that it is adjacent to rear wall 1b. It is in this position that reverse idler gear 25 engages with reverse input gear 23 as well as reverse output gear 24, as indicated by the solid lines in FIG. 2 and the broken lines in FIG. 3.

Fifth speed gear group G5 is composed so as to allow for mutual engagement between fifth speed input gear 26 formed as a single unit on rear end portion 5b of first input shaft 5 and fifth speed output gear 27 provided on counter shaft 15 so that it can rotate freely. Third speed gear group G3 is composed so as to allow for mutual engagement between third speed input gear 28 formed as a single unit on rear end portion 5b of first input shaft 5 and third speed output gear 29, which is drive coupled with counter shaft 15.

Further provided on counter shaft 15 is provided synchronous engaging device 30 disposed between first speed output gear 22 and fifth speed output gear 27, and when the coupling sleeve 30a is moved toward the left from the neutral position shown in FIG. 2 and is engaged with clutch gear 30b, first speed output gear 22 is drive coupled with counter shaft 15 and the first speed is the speed that can be selected as explained below, and when the coupling sleeve 30a is moved toward the right from the neutral position shown in FIG. 2 and is engaged with clutch gear 30c, fifth speed output gear 27 is drive coupled with counter shaft 15 and the fifth speed is the speed that can be selected, as explained below. Furthermore, on the periphery of coupling sleeve 30a are implanted gear teeth, which constitute reverse output gear 24. When reverse idler gear 25 is engaged with reverse output gear 24 at the neutral position in which it does not engage with either clutch gear 30b or 30c, as shown in FIG. 2 and as explained above, reverse output gear 24 is drive coupled with counter shaft 15 and as explained below, reverse is the gearshift that can be selected. The gear teeth for reverse output gear 24 are disposed by implanting them more toward the side at which rear wall 1b is located than peripheral groove 30g provided on the periphery of coupling sleeve 30a, as shown in FIG. 2.

Disposed between hollow second input shaft 6 and counter shaft 15 is the gearshift group for the even numbered gear shifting (second, fourth and sixth speeds), or in other words, in order, from the front side closest to engine counter shaft 2, are disposed second speed gear group G2, fourth speed gear group G4, and sixth speed gear group G6. Second speed gear group G2 is disposed at the front side of second input shaft 6 along front wall 1a of transmission case 1, sixth speed gear group G6 is disposed at the rear end of second input shaft 6, fourth speed gear group G4 is disposed in the center between both ends of second input shaft 4, and sixth speed gear group G6 is composed so as to allow for mutual engagement between sixth speed input gear 31 formed as a single unit around the periphery of second input shaft 6 and sixth speed output gear 32 rotatably provided on counter shaft 15.

Fourth speed gear group G4 is composed so as to allow for mutual engagement between fourth speed input gear 33 formed as a single unit around the periphery of second input shaft 6 and fourth speed output gear 34 rotatably provided on counter shaft 15. Second speed gear group G2 is composed so as to allow for mutual engagement between second speed input gear 35 formed as a single unit around the periphery of second input shaft 6 and second speed output gear 36 rotatably provided on counter shaft 15.

Further provided on counter shaft 15 is synchronous engaging device 37 disposed between third speed output gear 29 and sixth speed output gear 32, and when the coupling sleeve 37a is moved toward the left from the neutral position shown in the drawing and is engaged with clutch gear 37b, third speed output gear 29 is drive coupled with counter shaft 15 and the third speed is the speed that can be selected as explained below, and when the coupling sleeve 37a is moved toward the right from the neutral position shown in the drawing and is engaged with clutch gear 37c, sixth speed output gear 32 is drive coupled with counter shaft 15 and the sixth speed is the speed that can be selected, as explained below.

In addition, provided on counter shaft 15 is synchronous engaging device 38 disposed between fourth speed output gear 34 and second speed output gear 36, and when the coupling sleeve 38a is moved toward the left from the neutral position shown in the drawing and is engaged with clutch gear 38b, fourth speed output gear 34 is drive coupled with counter shaft 15 and the fourth speed is the speed that can be selected as explained below, and when the coupling sleeve 38a is moved toward the right from the neutral position shown in the drawing and is engaged with clutch gear 38c, second speed output gear 36 is drive coupled with counter shaft 15 and the second speed is the speed that can be selected, as explained below.

Next is provided an explanation of the gear shifting function and the transmission path for the drive coupling of the transmission having a plurality of automatic clutches that constitutes the aforementioned embodiment. The automatic clutches C1 and C2 for this embodiment are the normal open type, and for neutral (N) range or park (P) range, in which transmission of motive power is not desired, both automatic clutches C1 and C2 are left in the opened state.

When transmission of motive power is desired for the forward, or D range, or when transmission of motive power is desired for the reverse, or R range, the drive gearshift or reverse gearshift can be selected by controlling coupling sleeves 30a, 37a and 38a of synchronous engaging devices 30, 37 and 38, reverse idler gear 25 and automatic clutches C1 and C2, as explained below. When the first speed is desired, while in the D range, automatic clutch C1 is in the opened state, while coupling sleeve 30a of synchronous engaging device 30 is moved to the left and gear 22 is drive coupled with counter shaft 15, and then automatic clutch C1 is engaged. In this manner, the engine revolution from automatic clutch C1 is output to differential gear device 20 via first input shaft 5, first speed gear group G1, counter shaft 15 and counter gear 19 and transmission of motive power can be conducted in first speed. When first speed is selected to propel the vehicle, needless to say, the required control of automatic clutch C1 is carried out in order to engage it and advance forward.

When shifting up from first speed to second speed, automatic clutch C2 is in the opened state, while coupling sleeve 38a of synchronous engaging device 38 is moved to the right and gear 36 is drive coupled with counter shaft 15 in preparation for the next gearshift, or second speed (a pre-shift is carried out). Then, while continuing to keep automatic clutch C1 in the opened state, automatic clutch C2 is engaged and the shift is made from first speed to second speed. Due to this pre-shift, the torque output to differential gear device 20 when carrying out the pre-shift operation is not interrupted, which is advantageous in that there is no torque cut-off when shifting gears. When this up-shift is completed, coupling sleeve 30a of synchronous engaging device 30 is returned to the neutral position and gear 22 is uncoupled from counter shaft 15. In this manner, the engine revolution from automatic clutch C2 is output to differential gear device 20 via second input shaft 6, second speed gear group G2, counter shaft 15 and counter gear 19 and transmission of motive power can be conducted in second speed.

When shifting up from second speed to third speed, automatic clutch C1 is in the opened state, while coupling sleeve 37a of synchronous engaging device 37 is moved to the left and gear 29 is drive coupled with counter shaft 15 in preparation for the next gearshift, or third speed (a pre-shift is carried out). And then while continuing to keep automatic clutch C2 in the opened state, automatic clutch C1 is engaged and the shift is made from second speed to third speed. When this up-shift is completed, coupling sleeve 38a of synchronous engaging device 38 is returned to the neutral position and gear 36 is uncoupled from counter shaft 15. In this manner, the engine revolution from automatic clutch C1 is output to differential gear device 20 via first input shaft 5, third speed gear group G3, counter shaft 15 and counter gear 19 and transmission of motive power can be conducted in third speed.

When shifting up from third speed to fourth speed, automatic clutch C2 is in the opened state, while coupling sleeve 38a of synchronous engaging device 38 is moved to the left and gear 34 is drive coupled with counter shaft 15 in preparation for the next gearshift, or fourth speed (a pre-shift is carried out). And then while continuing to keep automatic clutch C1 in the opened state, automatic clutch C2 is engaged and the shift is made from third speed to fourth speed. When this up-shift is completed, coupling sleeve 37a of synchronous engaging device 37 is returned to the neutral position and gear 29 is uncoupled from counter shaft 15. In this manner, the engine revolution from automatic clutch C2 is output to differential gear device 20 via second input shaft 6, fourth speed gear group G4, counter shaft 15 and counter gear 19 and transmission of motive power can be conducted in fourth speed.

When shifting up from fourth speed to fifth speed, automatic clutch C1 is in the opened state, while coupling sleeve 30a of synchronous engaging device 30 is moved to the right and gear 27 is drive coupled with counter shaft 15 in preparation for the next gearshift, or fifth speed (a pre-shift is carried out). And then while continuing to keep automatic clutch C2 in the opened state, automatic clutch C1 is engaged and the shift is made from fourth speed to fifth speed. When this up-shift is completed, coupling sleeve 38a of synchronous engaging device 38 is returned to the neutral position and gear 34 is uncoupled from counter shaft 15. In this manner, the engine revolution from automatic clutch C1 is output to differential gear device 20 via first input shaft 5, fifth speed gear group G5, counter shaft 15 and counter gear 19 and transmission of motive power can be conducted in fifth speed.

When shifting up from fifth speed to sixth speed, automatic clutch C2 is in the opened state, while coupling sleeve 37a of synchronous engaging device 37 is moved to the right and gear 32 is drive coupled with counter shaft 15 in preparation for the next gearshift, or sixth speed (a pre-shift is carried out). And then while continuing to keep automatic clutch C1 in the opened state, automatic clutch C2 is engaged and the shift is made from fifth speed to sixth speed. When this up-shift is completed, coupling sleeve 30a of synchronous engaging device 30 is returned to the neutral position and gear 27 is uncoupled from counter shaft 15. In this manner, the engine revolution from automatic clutch C2 is output to differential gear device 20 via second input shaft 6, sixth speed gear group G6, counter shaft 15 and counter gear 19 and transmission of motive power can be conducted in sixth speed. When shifting down in order from sixth speed to first speed, a predetermined down-shift can be carried out by performing the opposite control from that performed for the aforementioned up-shift, and the torque output to differential gear device 20 when carrying out the down-shift operation is not interrupted, which is advantageous in that there is no torque cut-off when shifting gears.

When transmission of motive power is desired for the R range, automatic clutch C1 is in the opened state, while reverse idler gear 25 is moved toward the left and gear 24 is drive coupled with first input shaft 5, and then automatic clutch C1 is engaged. In this manner, the engine revolution from automatic clutch C1 is output to differential gear device 20 via first input shaft 5, reverse speed gear group GR, counter shaft 15 and counter gear 19 and by reversing the rotational direction by means of reverse gear group GR, transmission of motive power can be conducted in reverse. When reverse is selected to take off in reverse, needless to say, the required control of automatic clutch C1 is carried out in order to engage it and move backward. The selectable gearshifts for the transmission having a plurality of automatic clutches 102 are carried out as explained above by controlling the gear shifts of transmission controller 49.

In addition, when driving while maintaining one selectable gearshift, one of either first input shaft 5 or second input shaft 6 disposed on which are the input gears of the selectable gearshifts is drive coupled with crankshaft 2 and the coupling sleeve of the synchronous engaging device pertaining to the selectable gearshift is engaged with the clutch gear of the selectable gearshift. In this manner, the control device engages one of either automatic clutches C1 or C2, forms the transmission path, which is the main drive coupler, as explained above, and completely opens the other automatic clutch, either C1 or C2, that is not related to the selectable gearshift.

For example, when one of either the reverse, first, third or fifth speed gear shifts is being selected, automatic clutch C1 is completely engaged while synchronous engaging device 30 or 37 drive couples the gear (either one of 22, 27 or 29) pertaining to the selectable gearshift with counter shaft 15. In this manner, automatic clutch C1, first input shaft 5, the gear group being selected (either one of reverse gear group GR, first speed gear group G1, third speed gear group G3 or fifth speed gear group G5) and counter shaft 15 comprise the transmission path. On the other hand, the other automatic clutch C2 is completely opened, while synchronous engaging devices 37 or 38 couple the gear (either one of 22, 27 or 29) pertaining to the selectable gearshift with counter shaft 15. The reason for this is to prevent the occurrence of interlocking inside of the transmission having a plurality of automatic clutches 102 due to the engagement of both automatic clutches C1 and C2 when the synchronous gear devices engage either the reverse, first, third or fifth speed gearshift pertaining to first input shaft 5 while either the second, fourth or sixth speed gearshift pertaining to second input shaft 6 is in an engaged state. Interlocking takes place when two different gearshifts are simultaneously selected and mutual gear mechanisms become engaged and are unable to rotate, causing the input shaft(s) of the transmission and the rotation to stop.

The engagement capacity of automatic clutches C1 and C2 can further be explained in that when first input shaft 5 is coupled with the counter shaft while completely engaging both automatic clutch C1 and C2 and second input shaft 6 is also coupled with counter shaft 15, all of the their rotating components, 5, 6 and 15 become completely unable to rotate, causing the drive wheels to lock and making it impossible to drive the vehicle. However, for the control device for the present embodiment, by causing a slip-engagement of the other aforementioned clutch that is in the completely opened state, either C1 or C2, when determined to be necessary, as explained below, a braking force that utilizes interlocking can be generated, causing counter shaft 15 to decelerate.

Figure 4:
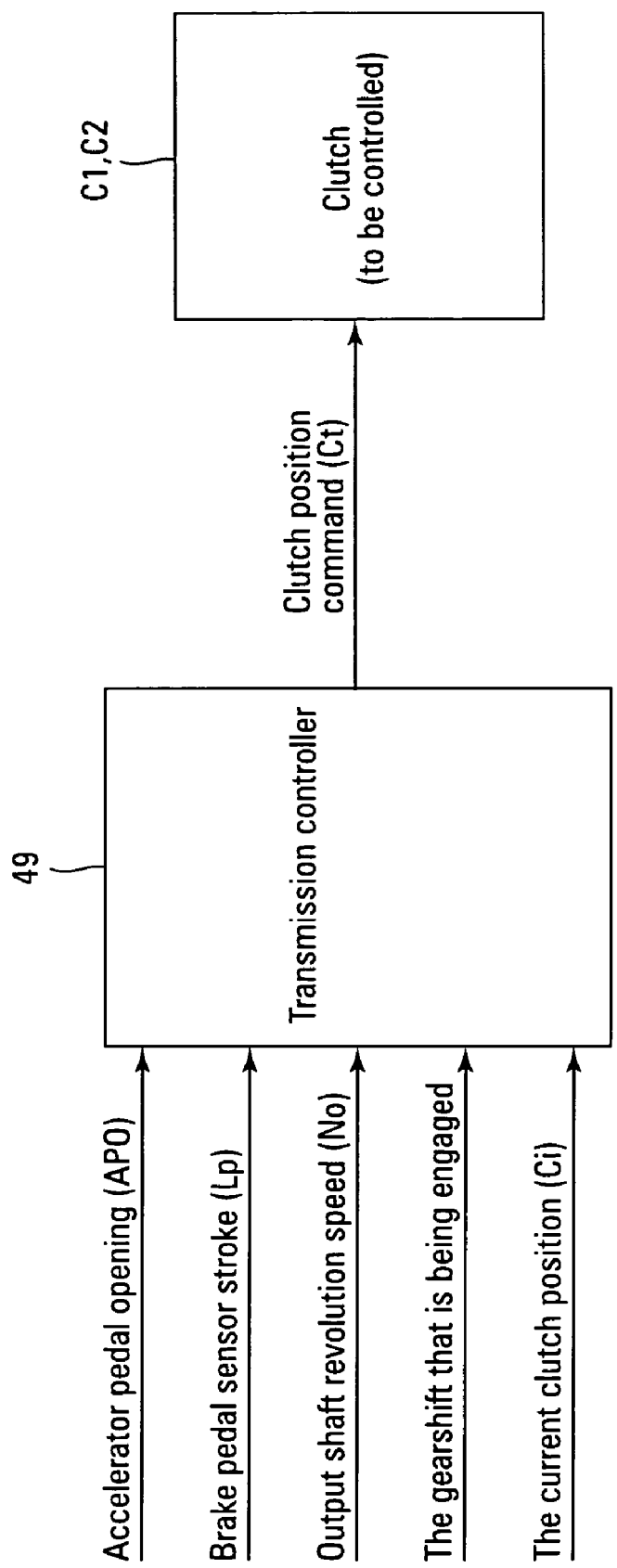
FIG. 4 shows the system outline that constitutes the interlock brake.

FIG. 4 is an outline of the system that constitutes the interlock brake, which is the braking function for the transmission having a plurality of automatic clutches for a first embodiment. Refer to the system constitution shown in FIG. 1 for common parts. Each of the wheels of the vehicle is equipped with a hydraulic disk brake that generates a braking force in accordance with the amount in which the brake pedal is depressed when the driver depresses the brake pedal (not shown in the drawing). Therefore, to controller unit 49 are input the brake stroke Lp from the brake sensor (not shown in the drawing) that detects the amount of depression of the brake pedal, the gear shifting information of the gear that is being engaged from shift position sensor 46, the actual clutch position Ci of automatic clutches C1 and C2 from clutch actuators 47 and 48, output revolution speed No, and the accelerator pedal opening APO.

Figure 5:
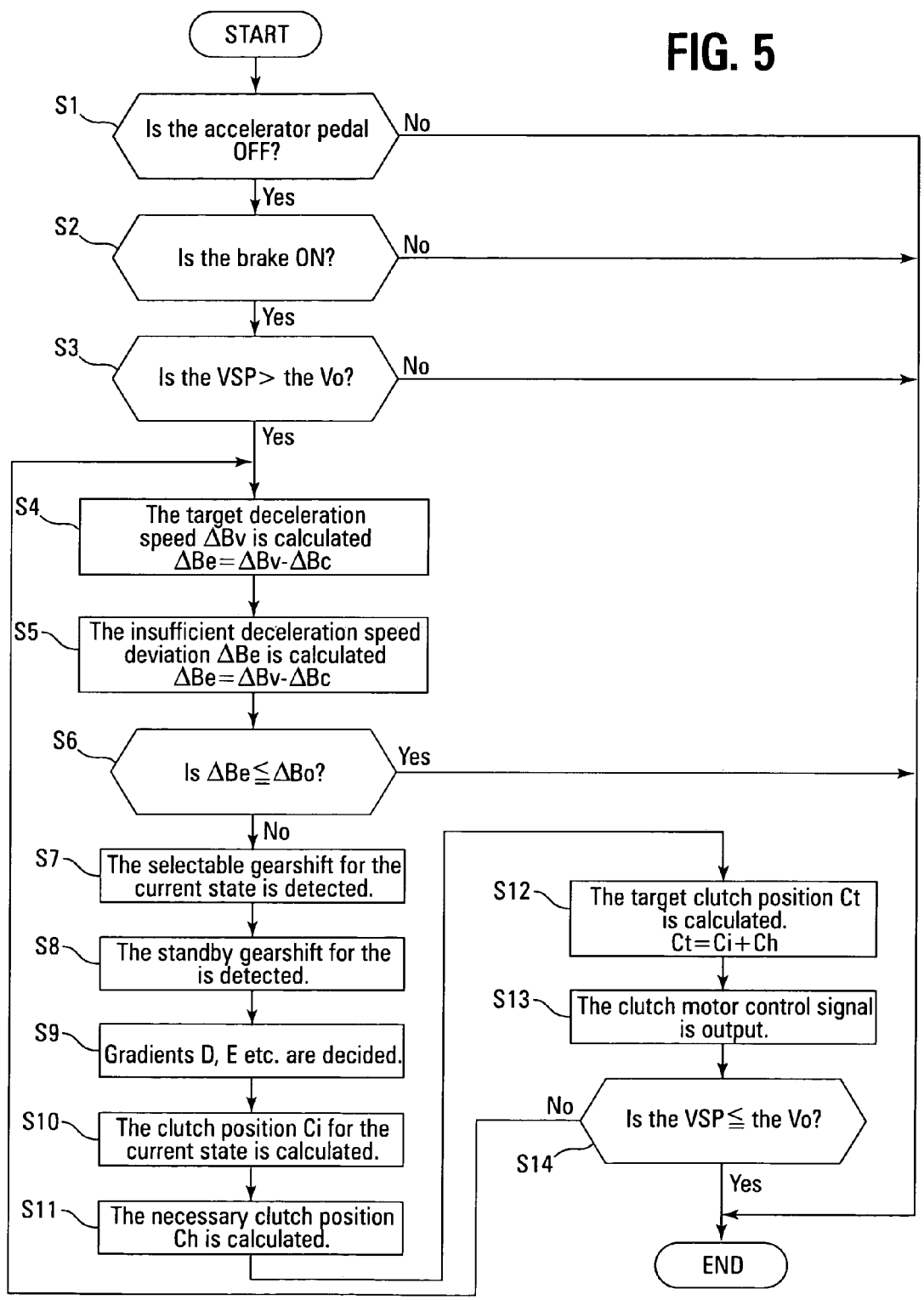
FIG. 5 is the flowchart showing the process for the interlock brake control.

Controller 49 executes the process shown in the flowchart for FIG. 5 based this input information, causes slip-engagement of the automatic clutch that is to be controlled, either C1 or C2, and controls the braking of the transmission having a plurality of automatic clutches. The process shown in FIG. 5 is repeatedly executed in fixed increments of 10 msec and, in Step S1, the accelerator pedal opening APO is read and it is determined whether or not the accelerator pedal operated by the driver is fully closed (OFF). If the accelerator pedal is not fully closed (No), this process is ended and the controller continues to monitor the accelerator pedal opening APO. If the accelerator pedal is fully closed (Yes), the process proceeds to Step S2.

At Step S2, the brake stroke Lp is read and it is determined whether or not the brake pedal is depressed (ON). If the brake pedal is not depressed (No), this process is ended, and the controller continues to monitor. If the brake pedal is being depressed (Yes), the process proceeds to Step S3. At Step S3, the output revolution speed No is read, and the vehicle speed VSP is calculated from the deceleration ratio of the deceleration mechanism, such as differential gear device 20, or the like. Then, it is determined whether or not the vehicle speed VSP is less than the interlock brake minimum vehicle speed Vo.

Figure 6:
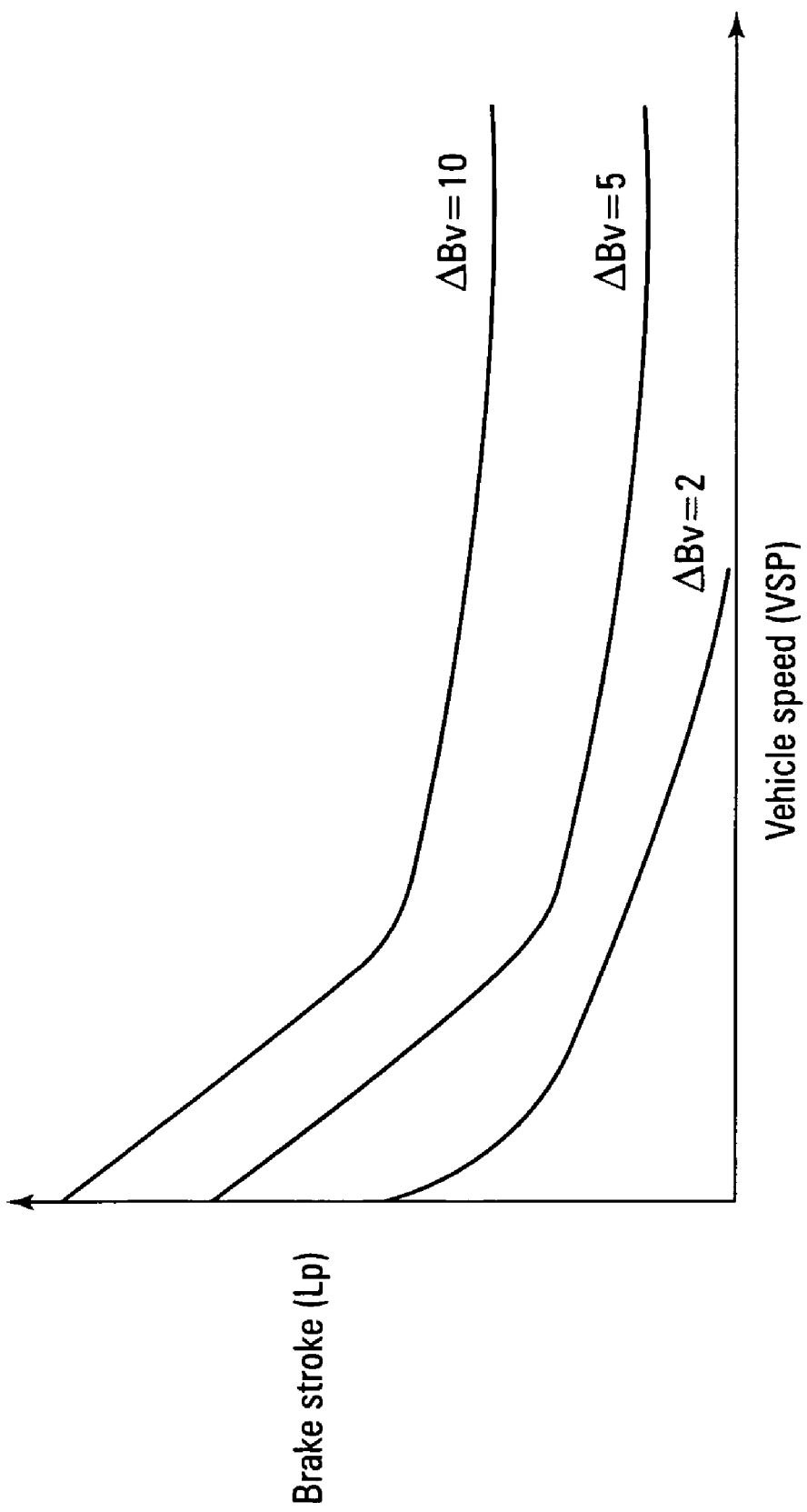
FIG. 6 is the Characteristics Map used for obtaining the target deceleration speed $\Delta Bv$ from the vehicle speed and the brake stroke.

If the vehicle speed VSP is less than the interlock brake minimum vehicle speed Vo (No), this process is ended, and the controller continues monitoring. If the vehicle speed VSP is more than the interlock brake minimum vehicle speed Vo (Yes), the process proceeds to Step S4. At Step S4, the target deceleration speed $\Delta Bv$ is obtained based on the vehicle speed VSP by referencing the Characteristics Map shown in FIG. 6, which is pre-memorized, based on the vehicle VSP and the brake stroke Lp that was read.

Next, at Step S5, the actual deceleration speed $\Delta Bc$ is calculated from the change in the vehicle speed VSP obtained in Step S3 above (The current vehicle speed VSP—the previous vehicle speed VSPO), and the insufficient amount of actual deceleration speed $\Delta Bc$ in relation to the target deceleration speed $\Delta Bv$ obtained in Step S4 above, which is the insufficient deceleration speed deviation $\Delta Be$, is calculated using the following formula (1).

$$\Delta Be = \Delta Bv - \Delta Bc \qquad (1)$$

At the next step, Step S6, it is determined whether or not the insufficient deceleration speed deviation $\Delta Be$ satisfies the threshold value $\Delta Bo$. If the insufficient deceleration speed deviation $\Delta Be$ is less than the threshold value $\Delta Bo$ and the braking force cannot be declared as insufficient (Yes), this process is ended and the controller continues monitoring. If the insufficient deceleration speed deviation $\Delta Be$ is more than the threshold value $\Delta Bo$ and the braking force is insufficient (No), the process proceeds to Step S7 and the optimum braking force due to interlock braking is calculated.

Aforementioned Steps S1~S6 are the starting conditions for interlock brake control. Steps S7~S13, which are explained below, are the core portion of the interlock brake control. At Step S7, the gear shifting information for the gear being engaged and the clutch position information is read, and it is detected whether the selectable gearshift actually performing the motive power transmission in the current running state is either the reverse gearshift or the first~sixth speed shift. Needless to say, the selectable gearshift in the current running state that is performing the motive power transmission is either first input shaft 5 or second input shaft 6 that is completely engaged by automatic clutch C1 or C2 and is the gearshift that is being engaged by synchronous engaging devices 30, 37 and 38. For example, when automatic clutch C1 is completely engaged, it is either one of the odd numbered gearshifts (first speed, third speed, fifth speed, or reverse) pertaining to first input shaft 5.

At the next step, Step S8, the gearshift that is being engaged by synchronous devices 30, 37 and 38, or in other words, the standby gearshift (pre-shift gearshift) that is to be shifted next by means of the gear-shifting function described above, is detected from the gearshift group pertaining to the other input shaft, which is not completely engaged. For example, when automatic clutch C2 is not completely engaged, it is either one of the even numbered gearshifts (second, fourth or sixth speed) pertaining to second input shaft 6.

Figure 8:
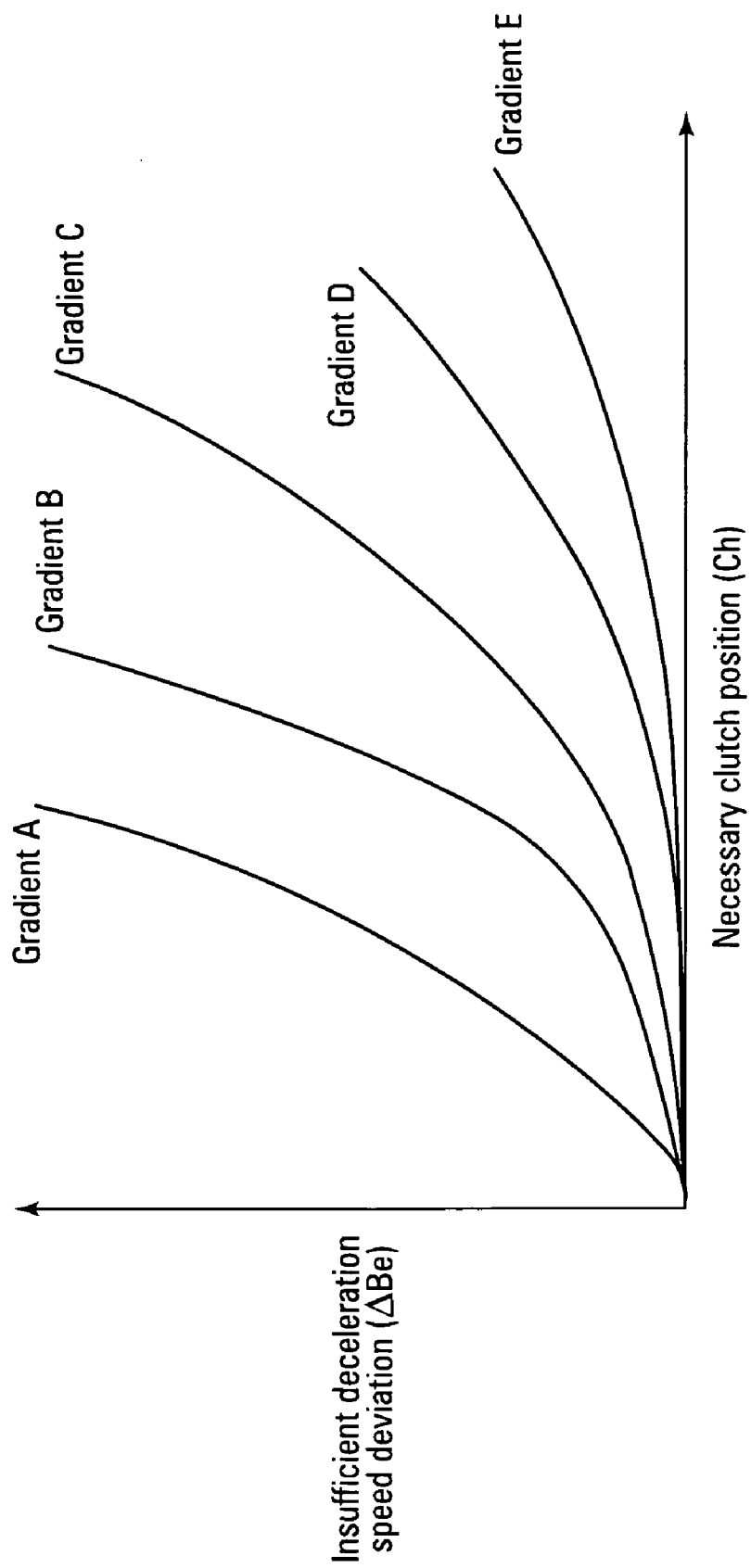
FIG. 8 is a characteristics chart showing the same gradients A~E, which are the relationship between the clutch position of the clutch that is being slip-engaged and the deceleration speed.

At Step S9, gradients A~E, which are used to perform the slip-engagement control of the other automatic clutch that is not completely engaged, are decided by referencing the chart shown in FIG. 7, which is based on the current selectable gearshift for the current state detected at Step S7 above and the standby gearshift detected at Step S8 above. Gradients A~E are the relationship between the clutch position of the clutch that is being slip-engaged and the deceleration speed obtained based on said position (characteristic function), as shown in FIG. 8.

The difference in shift for the selectable gearshift for the current state and the standby gearshift can further be explained by saying that as a rule, it is one shift, so the differential rotation of the other automatic clutch that is not completely engaged (the difference in rotation of the friction factor at the input side and the friction factor at the output side) is small. Therefore, even if the clutch position is advanced a great deal, the amount of deceleration speed obtained will be small, and the gradient will be small, such as that indicated by D or E in FIG. 8. The reason that there are two gradients is because the difference in the gearshift ratio between first and second speed is greater than the difference in the gearshift ratio between fifth and sixth speeds.

After the gradients are decided in Step S9 above, the process proceeds to Step S10 and the clutch position Ci for the current state for the other automatic clutch that is not completely engaged is detected. The clutch position Ci for when the interlock brake does not operate, is the completely opened position.

Next, at Step S11, the necessary clutch position Ch for the other automatic clutch that is not completely engaged is obtained from the insufficient deceleration speed deviation ΔBe calculated in Step S5 above by referencing the gradients that were decided in Step S9 above. Next, at Step S12, the target clutch position Ct for the other automatic clutch that is not completely engaged is calculated according to the following formula:

$$Ct = Ci + Ch \quad (2)$$

Next, at Step S13, a clutch motor control signal is output to motor 47s (48s) of clutch actuator 47 (or 48) for the other automatic clutch that is not completely engaged in order to realize the target clutch position Ct calculated in Step S12 above. An upper limit Cbmax is set for the clutch position command Ct to prevent the actual clutch position from advancing too far toward the side that is engaged causing the other automatic clutch that is not completely engaged to become completely engaged.

Next, at Step S14, the vehicle speed VSP for when the other automatic clutch that is not completely engaged has been advanced as far as the target clutch position Ct is calculated and it is determined whether or not said vehicle speed VSP is less than the interlock brake minimum vehicle speed Vo. If said vehicle speed VSP is greater than the interlock brake minimum vehicle speed Vo (No), the process returns to Step S4 and the interlock brake control is continued. When said vehicle speed VSP drops to the interlock brake minimum vehicle speed Vo (Yes), this process is ended. Step S14 above is the ending condition for the interlock brake control.

For a second embodiment, at Step S13 above, if the clutch position command Ct exceeds the upper limit Cbmax, the other automatic clutch that is not completely engaged cannot be advanced to the target clutch position and thus the insufficient deceleration speed deviation ΔBe cannot be covered, so the interlock brake control determines that the insufficient deceleration speed deviation cannot be resolved. In this case, the process does not proceed to Step S13 but changes the standby gearshift and shifts into either third speed or fifth speed for the difference in shift between the selectable gearshift for the current state and the standby gear shift. The difference in the gearshift ratio is expanded by increasing the gear shifts and the differential rotation of the other automatic clutch that is not completely engaged is increased. Therefore, even if the clutch position is advanced in the same manner, the deceleration speed obtained becomes greater as shown by gradients A~C in FIG. 8.

When large gradients are decided such as gradients A~C, the control process flow is returned to Step S11 and the necessary clutch position Ch is re-calculated. Next, at Step S12, the target clutch position Ct is re-calculated. In this manner, the re-calculated target clutch position Ct is set to be lower than the upper limit Cbmax, and the process proceeds to Step S13 and beyond. For example, if the selectable gearshift for the current state that was selected on the main transmission path, on which it is drive coupled by automatic clutch C1 that is completely engaged, is the fifth speed, and if the standby gear shift that is selected on another transmission path, on which it is drive coupled by automatic clutch C2 that is slip-engaged, is the fourth speed or the sixth speed, the gradient will be E, based on FIG. 7, when the insufficient deceleration speed deviation ΔBe is large, so if even if the necessary clutch position Ch is increased, the insufficient deceleration speed deviation ΔBe cannot be covered. In this case, the insufficient deceleration speed deviation ΔBe can be covered by shifting the standby gearshift down to second speed and setting it to gradient C.

For a third embodiment, the starting conditions for the interlock brake control will be as explained below instead of those described in Step S1~S6 and FIG. 5. When a pre-memorized predetermined time period has elapsed in which a state whereby the accelerator pedal opening is at approximately zero and the output revolution speed No of counter shaft 15 has increased, it is determined that the vehicle has been traveling downhill for a long distance (it determines that downhill travel has continued for a predetermined amount of time), the process proceeds to Step S7, as was explained above, and the interlock brake is operated. Thus the additional use of the hydraulic brakes by the driver, while coasting, can be avoided.

For a fourth embodiment, the starting conditions for the interlock brake control will be as explained below instead of those described in Step S1~S6 and FIG. 5. For a vehicle equipped with a snow mode switch that changes the shift pattern of the automatic gear shifting control when driving on snow covered roads, and the snow mode switch is ON, it is determined that the road surface friction factor is lower than normal (it is determined that the road surface friction factor is smaller than a predetermined value). When the road surface friction factor is lower than normal, if the driver presses down hard on the brake pedal, the wheels slip, so the process proceeds to Step S7 as explained above, and the interlock brake is operated. In this manner, the operation whereby the driver presses down hard on the brake pedal can be avoided, thus preventing the occurrence of slipping wheels.

For a fifth embodiment, the ending conditions for the interlock brake control will be as explained below instead of those described in Step S14 above and FIG. 5. Once it has been determined whether or not the vehicle deceleration speed calculated from the time change in the output revolution speed No is slower than a predetermined threshold value and it is then determined that the vehicle deceleration speed is a sudden deceleration, the control process performed in Steps S7~S13 is ended and the interlock brake operation is opened. Due to this, the concern that the wheels will become locked due to an excessive amount of braking force being applied can be minimized.

For a sixth embodiment, the ending conditions for the interlock brake control will be as explained below instead of those described in Step S14 above and FIG. 5. Once it has been determined from the brake pedal stroke Lp whether or not the amount in which the driver depresses the brake pedal is more than a predetermined threshold value and it is then determined that the driver has pressed down hard on the brake pedal, the control process performed in Steps S7~S13 is ended and the interlock brake operation is opened. Due to this, the concern that the wheels will become locked due to an excessive amount of braking force being applied can be minimized.

For a seventh embodiment, the ending conditions for the interlock brake control will be as explained below instead of those described in Step S14 above and FIG. 5. A temperature sensor is provided at automatic clutch C1 and C2 and when it is determined that the temperature of automatic clutch C1 and C2 is more than a predetermined threshold value, the control process in Steps S7~S13 is ended and the interlock brake operation is opened. In this manner, the burning of automatic clutches C1 and C2 can be avoided.

Therefore, for the first embodiment, the reverse and first through sixth speed shifts are divided into an odd numbered gear shifting group and an even numbered gear shifting group, and automatic clutch C1 that performs coupling and uncoupling for the drive coupling operation is provided for first input shaft 5 that shares the reverse, first, third and fifth speeds to constitute the odd numbered gear shifting group, and automatic clutch C2 that performs coupling and uncoupling for the drive coupling operation is provided for second input shaft 6 that shares the second, fourth and sixth speeds to constitute the even numbered gear shifting group, and when one clutch of either automatic clutch C1 or C2, for example automatic clutch C1, is completely engaged while at the same time one gearshift is selected from the odd numbered gear shifting group pertaining to automatic clutch C1 that has been completely engaged by synchronous engaging devices 30, 37 and 38 to constitute a transmission path for the drive coupling, the target clutch position command Ct is applied to the other automatic clutch (for example, clutch actuator 48 of automatic clutch C2) and the slip-engagement is performed while at the same time synchronous devices 30, 37 and 38 select one gearshift from the even numbered gear shifting group pertaining to the other automatic clutch C2 to constitute another transmission path, thus causing an interlock inside of the transmission having a plurality of automatic clutches 102 and enabling control of the counter shaft that corresponds to the output shaft by means of this interlock operation.

Therefore, a stable deceleration speed can continuously be achieved, regardless of how the engine brake or hydraulic brake is operated, and the function of a back-up brake for when traveling downhill over long distances can be provided. In addition, even when a decline in the function or a default of the hydraulic brake occurs, there is no need to provide a separate, new brake device and the deceleration of the vehicle can be effectively realized. Furthermore, the interlock brake for the present invention is a transmission having a plurality of automatic clutches equipped with a shaft for each of a plurality of gear shifting groups, and of these, one shaft constitutes the transmission path for the drive coupling operation and the other shaft constitutes another transmission path, thus forming a constitution that causes the interlock.

For the purposes of the present invention, the plurality of gear shifting groups and the same number of shafts are divided into a minimum of two gear shifting groups, as is the case in the present embodiment, and automatic clutches C1 and C2 are respectively provided for shaft 5, which shares a plurality of gear shifts (reverse, first, third and fifth speeds) that constitute one of the groups, and shaft 6, which shares a plurality of gearshifts (second, fourth and sixth speeds) that constitute the other group to make up a twin-clutch type transmission. In addition, for the present embodiment, by providing a means (Step S9) for detecting the gearshift difference, which is the difference between the gear shift selected on the main transmission path on which complete engagement of the clutch takes place and the gearshift selected on another transmission path on which slip-engagement takes place, selecting gradients A~E that correspond to the detected gearshift difference, and controlling (Step S13) the slip position of the clutch that is slip-engaged, the insufficient braking force of the engine brake and hydraulic brake can be favorably reinforced.

For aforementioned second embodiment, by deciding on which gear shift is selected on the other transmission path on which slip-engagement takes place, based on the gearshift selected on the main transmission path on which complete engagement takes place and the insufficient deceleration speed deviation ΔBe corresponding to the requested braking force, so that the difference in gearshift is sufficient enough to cover this insufficient deceleration speed deviation ΔBe, and so that when the braking force obtained from the hydraulic brakes and engine brake becomes extremely small due to a defect or some other reason and a situation occurs in which the interlock braking for the present invention must be heavily relied upon, the necessary deceleration can be achieved and the performance of the back-up brake in a vehicle, which is the objective of the present invention, can be improved.

For aforementioned third and fourth embodiments, by providing a means for determining whether or not a vehicle is traveling downhill for a long distance and or a means for determining whether or not the road surface friction factor is more than a predetermined value, and when these means make an affirmative determination, the interlock brake control in aforementioned Steps S7~S13 is executed so that the additional use of the hydraulic brakes by the driver when traveling downhill over long distances can be avoided. In addition, the operation of pressing down hard on the brake pedal performed by the driver when driving on a road with low friction can also be avoided and the slipping of the wheels can be prevented.

For aforementioned fifth, sixth, and seventh embodiments, by providing at least one means in which it is either determined whether or not the vehicle deceleration speed is slower than a predetermined value, or whether or not the amount in which the brake pedal is being depressed by the driver is more than a predetermined value, or whether or not the temperature of each of the aforementioned clutches is more than a predetermined value so that when the interlock brake control in aforementioned Steps S7~S13 is being executed and these means make an affirmative determination, the interlock brake control in aforementioned Steps S7~S13 is opened, thus reducing the concern that the wheels will become locked due to an excessive amount of braking force being applied. Also, burning of automatic clutches C1 and C2 can be avoided.

Although specific embodiments have been illustrated and described herein various changes may be added as long as they do not deviate from the scope of the gist of the present invention. If the revolution speed for the transmission having a plurality of automatic clutches is ultimately transmitted to one output shaft, it does not have to be restricted to a twin-clutch type of transmission and may be equipped with three or more clutches and the same number of input shafts. So, for example, if it has three automatic clutches, one of the automatic clutches can be engaged, and at least one of the remaining automatic clutches can be made to slip, or in other words, at least one of the remaining automatic clutches can be made to slip while the other is opened, or both of the two remaining automatic clutches can be made to slip. In addition, even if it is a twin-clutch type transmission equipped with two input shafts, it can be constituted so that it is equipped with a plurality of counter shafts for the deceleration shifts with a separate counter shaft whereby the revolution speed is selectively transmitted to the plurality of counter shafts.

What is claimed is:

1. A transmission comprising:
a first input shaft having a plurality of gearshifts that form a first gearshift group;
a second input shaft having a plurality of gearshifts that form a second gearshift group;
a first automatic clutch corresponding to the first gearshift group and inserted between the first input shaft and an engine drive shaft;
a second automatic clutch corresponding to the second gearshift group and inserted between the second input shaft and the engine drive shaft; and
a controller that selects a first gearshift from one of either the first gearshift group or the second gearshift group in accordance with a driving condition of a vehicle having the transmission, engages the clutch corresponding to the gearshift group with the selected first gearshift, selects a second gearshift from the other one of either the first gearshift group or the second gearshift group, causes the clutch corresponding to the gearshift group with the selected second gearshift to slip, and performs interlock brake control,
the controller further being configured to end the interlock brake control when at least one of the following occurs:
the controller determines that a deceleration speed is greater than a predetermined threshold value;
the controller determines that a vehicle that comprises the transmission has continued to travel downhill for a predetermined period of time; and
the controller determines that a road surface friction factor is less than a predetermined value.

2. The transmission of claim 1, wherein
the controller controls a capacity of the slip based on the first gearshift and the second gearshift.

3. The transmission of claim 1, wherein
the controller calculates an insufficient deceleration speed deviation based on a target deceleration speed and an actual deceleration speed, calculates a clutch position that corresponds to the insufficient deceleration speed deviation based on the first gearshift and the second gearshift, and controls a capacity of the slip based on the calculated clutch position.

4. The transmission of claim 1, wherein
the controller calculates an insufficient deceleration speed deviation based on a target deceleration speed and an actual deceleration speed and when it determines that the insufficient deceleration speed deviation cannot be resolved by means of the interlock brake control, it selects a third gearshift from the same gearshift group, from which the second gearshift is selected, in a direction in which a difference in a gearshift ratio between one of the gearshift groups and the other one of the gearshift groups becomes larger.

5. The transmission of claim 1, wherein
the controller begins the interlock brake control when at least one of the following occurs:
an accelerator pedal is OFF and a brake pedal is ON;
the controller determines that a vehicle that comprises the transmission has continued to travel downhill for a predetermined period of time; and
the controller determines that a road surface friction factor is less than a predetermined value.

6. A transmission comprising:
a first gearshift group;
a second gearshift group; and
a controller configured to perform a method comprising:
fully coupling the first gearshift group to an engine drive shaft; and
partially coupling the second gearshift group to the drive shaft while the first gearshift group is fully coupled to the drive shaft in response to at least one of
an accelerator pedal is OFF and a brake pedal is ON;
a vehicle that comprises the transmission has continued to travel downhill for a predetermined period of time; and
a road surface friction factor is less than a predetermined value.

7. The transmission of claim 6, wherein
the first gearshift group comprises a plurality of gearshifts.

8. The transmission of claim 6, wherein
the second gearshift group comprises a plurality of gearshifts.

9. The transmission of claim 6, wherein
the first and second gearshift groups are respectively disposed on first and second input shafts.

10. The transmission of claim 9, and further comprising
first and second automatic clutches, wherein the first automatic clutch is disposed between the first input shaft and the drive shaft, and wherein the second automatic clutch is disposed between the second input shaft and the drive shaft.

11. The transmission of claim 6, wherein, in the method,
the partially coupling of the second gearshift group to the drive shaft comprises slippingly coupling the second gearshift group to the drive shaft.

12. A transmission comprising:
means for fully coupling a first gearshift group to an engine drive shaft;

means for slippingly coupling a second gearshift group to the drive shaft while the first gearshift group is fully coupled to the drive; and means for calculating a deceleration speed deviation based on a target deceleration speed and an actual deceleration speed.

13. The transmission of claim 12, and further comprising
means for controlling a capacity of the slip between the second gearshift group and the drive shaft based on the first and second gearshift groups.

14. A method of operating a transmission, comprising:
fully coupling a first gearshift group to an engine drive shaft; and
partially coupling a second gearshift group to the drive shaft while the first gearshift group is fully coupled to the drive shaft in response to at least one of
an accelerator pedal is OFF and a brake pedal is ON;
a vehicle that comprises the transmission has continued to travel downhill for a predetermined period of time; and
a road surface friction factor is less than a predetermined value.

15. The method of claim 14, and further comprising
decoupling the second gearshift group from the drive shaft in response to at least one of
a deceleration speed is greater than a predetermined threshold value;
an amount by which a brake pedal is depressed is greater than a predetermined threshold value; and
a temperature of a first clutch that frilly couples the first gearshift group to the drive shaft and a second clutch that partially couples the second gearshift group to the drive shaft is greater than a predetermined threshold value.

16. The method of claim 14, wherein
the partially coupling of the second gearshift group to the drive shaft comprises slippingly coupling the second gearshift group to the drive shaft.

17. The method of claim 14, and further comprising
controlling a capacity of the partial coupling of the second gearshift group to the drive shaft based on the first and second gearshift groups.

18. The method of claim 14, and further comprising:
calculating an insufficient deceleration speed deviation based on a target deceleration speed and an actual deceleration speed;
calculating a position of a clutch that partially couples the second gearshift group to the drive shaft based on the first and second gearshift groups; and
controlling a capacity of the partial coupling of the second gearshift group based on the calculated clutch position of the clutch that partially couples the second gearshift group to the drive shaft.

19. The method of claim 14, and further comprising:
calculating an insufficient deceleration speed deviation based on a target deceleration speed and an actual deceleration speed;
determining that the insufficient deceleration speed deviation cannot be resolved by a first gearshift of the second gearshift group that partially couples the second gearshift group to the drive shaft; and
selecting a second gearshift of the second gearshift group in a direction in which a difference in a gearshift ratio between the first and second gearshift groups becomes larger.

20. A method of operating a transmission, comprising:
fully coupling a first gearshift group to an engine drive shaft;
partially coupling a second gearshift group to the drive shaft while the first gearshift group is fully coupled to the drive shaft; and
decoupling the second gearshift group from the drive shaft in response to at least one of
a deceleration speed is greater than a predetermined threshold value;
an amount by which a brake pedal is depressed is greater than a predetermined threshold value; and
a temperature of a first clutch that fully couples the first gearshift group to the drive shaft and a second clutch that partially couples the second gearshift group to the drive shaft is greater than a predetermined threshold value.

21. A method of operating a transmission, comprising:
fully coupling a first gearshift group to an engine drive shaft;
partially coupling a second gearshift group to the drive shaft while the first gearshift group is fully coupled to the drive shaft;
calculating an insufficient deceleration speed deviation based on a target deceleration speed and an actual deceleration speed;
calculating a position of a clutch that partially couples the second gearshift group to the drive shaft based on the first and second gearshift groups; and
controlling a capacity of the partial coupling of the second gearshift group based on the calculated clutch position of the clutch that partially couples the second gearshift group to the drive shaft.

* * * * *